(12) United States Patent
Kulkarni et al.

(10) Patent No.: US 6,518,975 B1
(45) Date of Patent: Feb. 11, 2003

(54) MODULARIZED ARCHITECTURE FOR COLOR AND IMAGE MANAGEMENT SYSTEM

(75) Inventors: Manish Kulkarni, Sunnyvale, CA (US); Moshe Broudo, Cupertino, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/165,374

(22) Filed: Oct. 2, 1998

(51) Int. Cl.[7] .............................. G09G 5/02; G09G 5/04
(52) U.S. Cl. ......................... 345/589; 345/593; 345/604
(58) Field of Search ................................. 345/333, 904, 345/589, 593, 594, 604; 395/500; 382/162, 164, 165, 172

(56) References Cited

U.S. PATENT DOCUMENTS

| | | | | |
|---|---|---|---|---|
| 5,515,524 A | * | 5/1996 | Lynch et al. | 395/500 |
| 5,561,459 A | * | 10/1996 | Stokes et al. | 345/904 |
| 5,617,514 A | * | 4/1997 | Dolby et al. | 395/51 |
| 5,630,025 A | * | 5/1997 | Dolby et al. | 395/51 |
| 5,708,798 A | * | 1/1998 | Lynch et al. | 395/500 |
| 5,844,554 A | * | 12/1998 | Geller et al. | 345/333 |
| 6,037,950 A | * | 3/2000 | Lynch | 395/500 |

* cited by examiner

Primary Examiner—Matthew Luu
(74) Attorney, Agent, or Firm—Fitzpatrick, Cella, Harper & Scinto

(57) ABSTRACT

A configurable color and image management system which allows a developer to create customized color and image management for a color-related application operating in a specified environment. A configurator is provided which has access to a library of plural classes of color and image management functionality, with each class including plural different modules of varying complexity and processing quality. The classes pertain to different aspects of color and image management functionality, such as a class to perform linearization and gamma correction, a class to perform color space transformation, a class to perform image correction, a class to perform gray color component replacement, a class to perform image expansion, and a class to perform halftone processing. The developer provides design parameters which define the operating environment within which the target color and image management system is designed to operate. Based on the design parameters, the configurator selects the highest quality modules in whichever classes of color and/or image management functionality are needed, all within the constraints defined by the parameters of the operating environment. Thereafter, a list of the selected modules are provided to a core module which provides a framework from which the selected modules can be invoked to realize the target color and image management system.

24 Claims, 8 Drawing Sheets

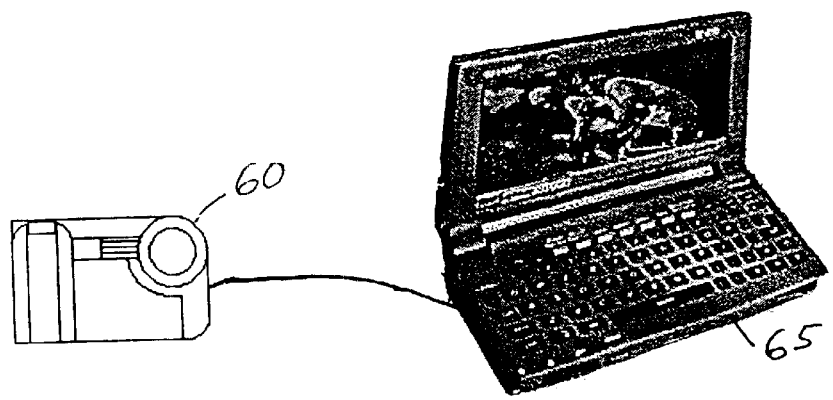
FIG. 4A
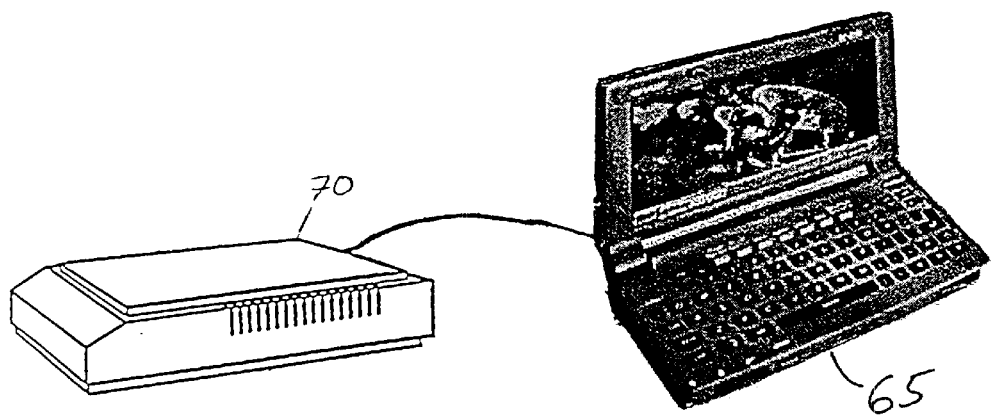
FIG. 4B
| FIG. 4A |
| FIG. 4B |
| FIG. 4C |
| FIG. 4D |
FIG. 4

| Path | |
|---|---|
| 1 | [RGB to CMYK] » [Expansion] » [Halftoning] |
| 2 | [RGB to RGB] » [RGB to CMYK] » [Expansion] » [Halftoning] |
| 3 | [Auto-correction] » [RGB to RGB] » [RGB to CMYK] » [Expansion] » [Halftoning] |

FIG. 6

MODULARIZED ARCHITECTURE FOR COLOR AND IMAGE MANAGEMENT SYSTEM

BACKGROUND OF THE INVENTION

1. Field of the Invention

The present invention relates to color and image management systems for use in transforming and maintaining color and image fidelity in personal computing systems as well as non-PC systems, such as cash registers or the like, and in particular the invention relates to configuration and generation of such color and image management systems based on a modularized architecture.

2. Description of the Related Art

One important emphasis in today's computing equipment is maintenance of good color fidelity for a color image, even when the color image is obtained, viewed, and reproduced using a variety of different computer equipment. For example, good color fidelity is required when obtaining an image using a scanner or digital camera, when viewing the image on a monitor, and when printing the image on a color printer.

Computerized color and image management systems have been developed for this purpose. One job of such color and image management systems is to manage color transformations across devices, so as to ensure good color fidelity of a color image when displayed, obtained, or reproduced by different devices.

One difficulty in designing such systems is that each system tends to be specifically tailored for one type of device and one computing system. For example, a first color and image management system used to print color images that have been viewed on a personal computer's monitor will be tailored to the operating environment of the personal computer, as well as to the color characteristics of the monitor and the printer. Thus, this first color and image management system will be completely unusable in a different operating environment, such as one including a hand-held personal digital assistant, which prints images viewed on an LCD screen. A second color and image management system for such an environment would need to be designed and built, specifically tailored for color transformation from an LCD screen to a color printer.

Moreover, such a second system must compensate for the limited memory and processing power provided by the hand-held PC. Accordingly, a developer of such a second system must be well versed in color processing techniques in order to develop a second system which performs necessary processing while maintaining a desirable trade-off between processing quality and resource usage.

As a result, design of each new color and image management system, tailored for certain operating environments and particular devices, is complicated, time consuming and costly. It is therefore not now practical to design new color and image management systems within short development schedules, and rudimentary color and image management systems, with poor performance, are often used instead.

SUMMARY OF THE INVENTION

It is an object of the invention to address the foregoing difficulties by providing for automated construction of a target color and image management system based on modularized libraries of color and image management functions. Thus, the invention allows software developers to create customized color and image management systems for use in color-related applications executing in various operating environments.

According to one aspect, the invention is a configurator which has access to classes of color and image management modules, each class performing specific color and/or image management functionality. Preferably, for example, one class of modules is provided for linearization and gamma correction functionality (such as RGB-to-RGB conversion or CMYK-to-CMYK conversion), another class of modules is provided for color space transformation (such as RGB-to-CMYK conversion), yet another class of modules is provided for image-wide correction (such as histogram equalization or color hue and brightness correction), yet another class of modules is provided for black generation and undercolor removal, still another class of modules is provided to expand input image data resolution to output device resolution, and still yet another class of modules pertains to halftoning functionality. Within each class of modules, a library of plural different modules is provided, with each different module preferably varying in complexity, processor requirements, and processing quality from other modules in the class.

A software developer provides the configurator with user-defined parameters that define the operating environment in which the target color management system is designed to operate, such parameters including memory and processor capabilities, input and output device definition, operating system requirements, identity of operating system, and the like. Based on the operating environment defined by such parameters, the configurator automatically selects appropriate modules from required ones of the classes of modules for use in building a color management system meeting the parameters.

In more specific aspects of the invention, the configurator automatically selects modules to build a color management system by determining which particular color space transformations are needed, based on defined input device and output device parameters. For example, in a situation where the input device is an LCD screen of a hand-held personal digital assistant and the output device is a color ink jet printer, the needed color space transformation is 24-bit RGB (used by the LCD screen) to 4-bit CMYK (used by the ink jet printer). The configurator thereupon builds a path list based on the transformations that are needed, the path list consisting of multiple paths of all possible classes of modules that could realize the needed transformation. For each path in the path list, the configurator then analyzes quality factors corresponding to modules of each class in the path so as to determine which of the paths in the path list produces the highest quality processing while remaining within memory and processor parameters defined by the developer. Preferably, the highest quality operative path is chosen as follows: the configurator includes a pre-assigned weight corresponding to an impact on image quality of each different class of modules. Each different module in each class also includes a quality factor, such as a count of the number of cycles that the module needs to process each pixel in the image (which makes the implicit assumption that more cycles per pixel yields a higher quality image). Then, to determine the path resulting in highest-quality processing, the configurator compares the sums of the quality factors of each module in each path.

In the event that the configurator is not able to choose the highest quality module in each class of modules and still meet the memory and processor constraints, the configurator iterates through the path list and chooses a next lower quality module in the least important class, and so on, until the overall performance constraints can be met.

Once the best quality path that still meets the performance constraints has been selected, the configurator preferably enters a manual edit mode, whereby the developer can alter the automatic module and path selections made by the configurator so as to suit specific needs of the target system.

Finally, the configurator automatically generates code in a higher level language, such as C or C++, so as to implement the selected color management modules. In this regard, the configurator has access to a core module which, according to the code, forms a framework into which each of the selected modules may be inserted so as to obtain the target color and image management system.

By virtue of the foregoing, in which a configurator automatically selects modules from libraries of modules for each of plural classes of color and image management functionality, a configurator according to the present invention provides the ability to support a variety of different kinds of color transformations such as automatic color corrections, color conversions, gray component replacement and halftoning. Further, the modular design of the present invention also provides the ability to support third party color processing modules or module classes, which simply can be inserted into a library of modules or as a new module class so as to operate seamlessly with the system as a whole.

Moreover, by virtue of the automatic nature of the configurator, different system configurations can be built quickly and rapidly, so as to accommodate differences in operating environments, such as the difference between a small-platform Windows CE environment and a large-platform Windows NT environment. Such flexibility is becoming increasingly important, particularly in non-Windows environments or environments where the operating system does not allow large amounts of memory to be used or large amounts of processor power to be devoted to color and/or image management. The modular design of this system also facilitates adaptability of system so that new emerging standards can easily be incorporated.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 4, comprising FIG. 4A to FIG. 4D, shows outward views of operating environments for which color and image management systems can be created in accordance with the present invention.

FIG. 6 shows a list of module class paths for use in accordance with the present invention.

DETAILED DESCRIPTION OF THE PREFERRED EMBODIMENTS

Figure 1:
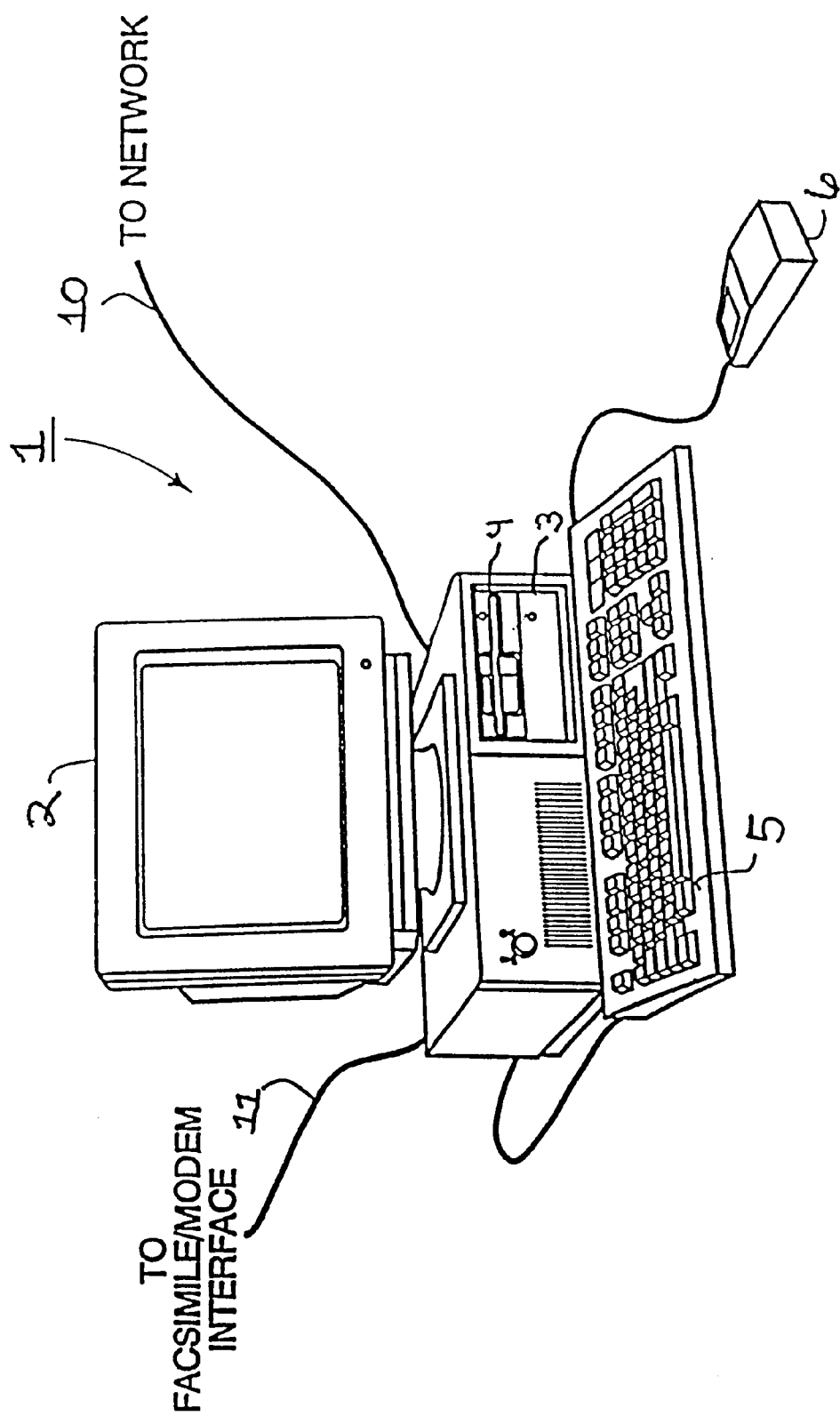
FIG. 1 is an outward view of representative computing equipment for developing a color and image management system using a modularized architecture according to the present invention.

FIG. 1 is an outward view of computing equipment for use in conjunction with the present invention. Computing equipment 1 is preferably a PC-compatible system operating a windowing environment such as Microsoft Windows NT™. Of course, other types of computing systems and development platforms may be used in practicing the present invention, such as a MacIntosh™ system or a Unix™ system.

Computing equipment 1 includes display screen 2 for displaying images and/or user interfaces to a user. Also included in computing equipment 1 are fixed disk 3 for storing application files, source code, data files, operating system files, and other files for use with computing system 3. In this regard, such files may also be obtained from a floppy disk (not shown) accessed using floppy disk drive 4. Alternatively, files may be obtained from a CD-ROM through a CD-ROM drive (neither shown).

Keyboard 5 is used to enter text data and commands into computing equipment 1. Mouse 6 is also used for entering data and commands into computing equipment 1, preferably by selecting and manipulating objects of a user interface displayed on display screen 2.

Network connection 10 can be used to communicate with other computing systems or devices located on a network, and to access computer-executable process steps of application files and data files located on a network. Data files and application files can also be downloaded from the World Wide Web (WWW) via facsimile/modem interface 11.

Figure 2:
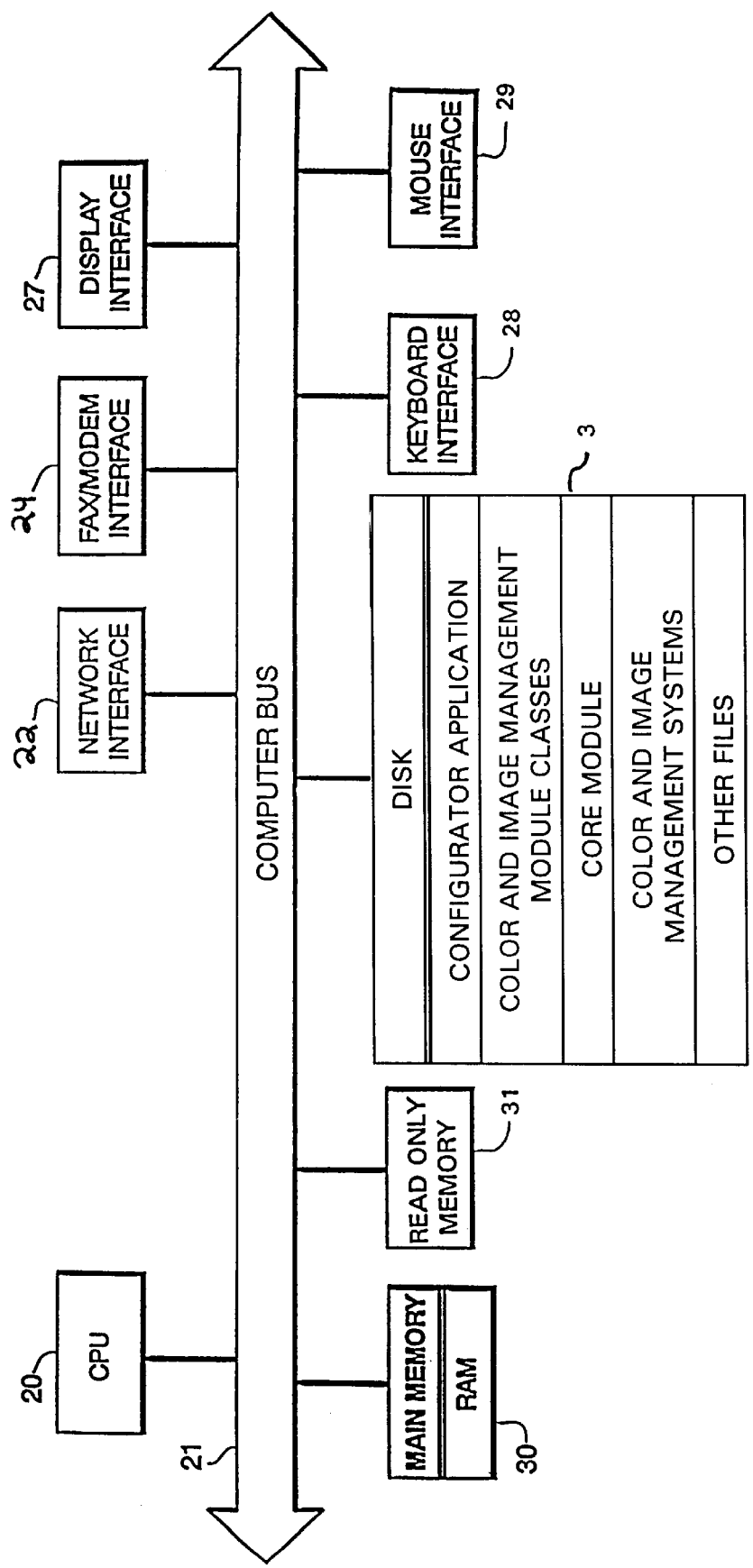
FIG. 2 is a block diagram representing an internal architecture of the FIG. 1 computing system.

FIG. 2 illustrates the internal architecture of computing equipment 1. As shown in FIG. 2, computing equipment 1 includes central processing unit (CPU) 20 which interfaces with computer bus 21. Also interfacing with computer bus 21 are network interface 22, fax/modem interface 24, display interface 27, keyboard interface 28, mouse interface 29, main memory 30, and read only memory 31.

Main memory 30, which is preferably a random access memory (RAM), interfaces with computer bus 21 so as to provide memory storage to CPU 20 during execution of computer-executable process steps. More specifically, CPU 20 loads computer-executable process steps from fixed disk 3 into RAM 30 and executes the stored process steps from RAM 30 to exploit a modularized architecture for a color and image management system according to the present invention.

As shown in FIG. 2, fixed disk 3 includes color and image management module classes and a core module of a modularized architecture according to the present invention. Fixed disk 3 also includes computer-executable process steps of a configurator application to create color and image management systems according to the present invention. Accordingly, disk 3 also stores color and image management systems created according to the present invention. Other files, such as operating system files, other application files, data files, and device drivers are also stored on fixed disk 3.

Figure 3:
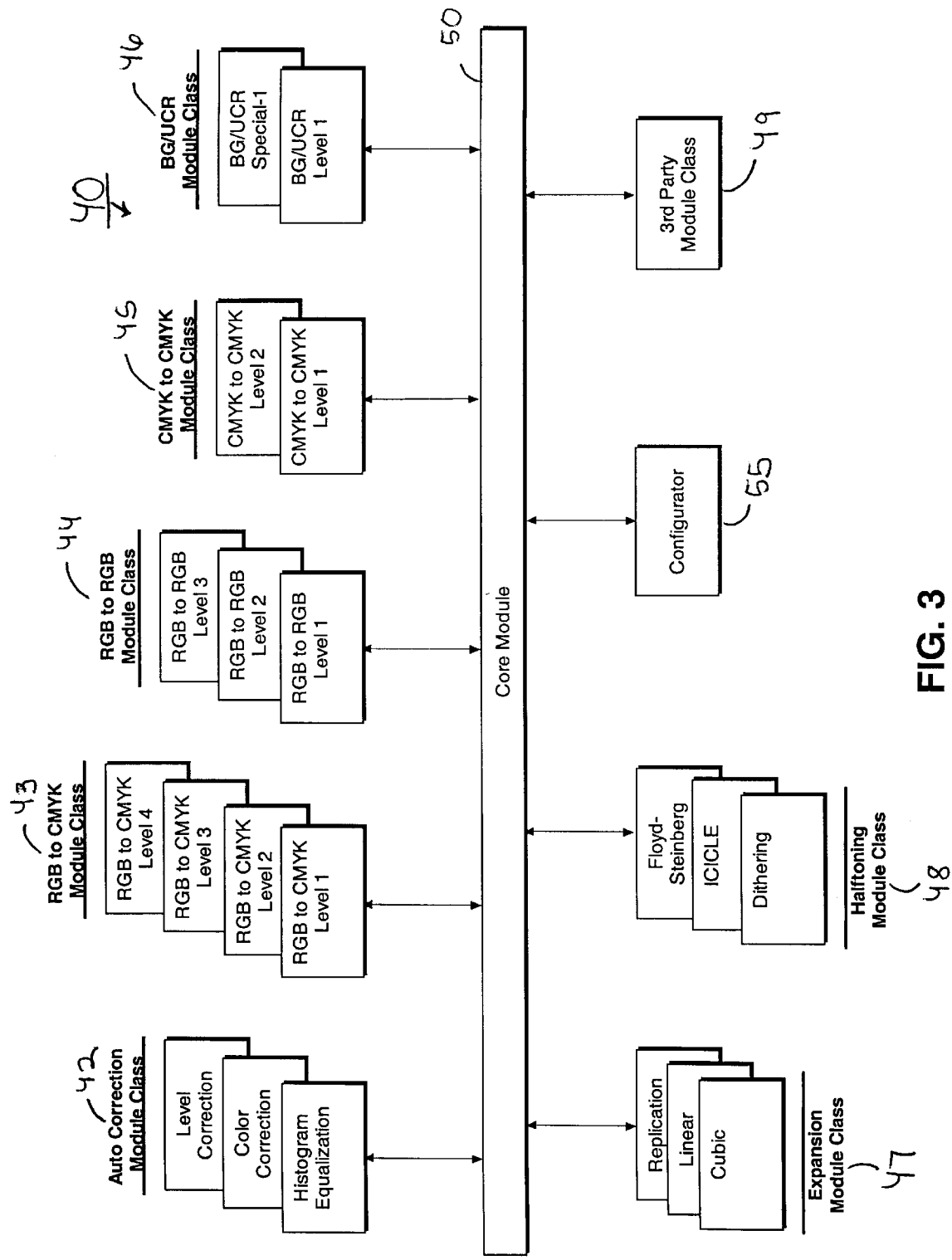
FIG. 3 is a block diagram illustrating a modularized architecture according to the present invention.

FIG. 3 is a block diagram of a modularized architecture according to the present invention. As shown, modularized architecture 40 includes module classes 42 to 49. Each module class contains modules which produce a specified output based on a specified input. In this regard, auto correction module class 42 produces 24-bit RGB data from 24-bit RGB data, RGB to CMYK module class 43 includes modules which take 24-bit RGB data as input and transform the RGB data into 32-bit CMYK data, and RGB to RGB module class 44 includes modules to transform colors from a 24-bit RGB color space to another 24-bit RGB color space. Similarly, CMYK to CMYK module class 45 includes modules each capable of transforming 32-bit CMYK data to other 32-bit CMYK data.

Moreover, black generation/undercolor removal module class 46 includes modules to convert 32-bit CMYK data to 32-bit CMYK data. Expansion module class 47 contains modules which can expand a bitmap image from a given input size to a given output size. Such expansion is often necessary for printing image data displayed on display screen 2, which must be expanded from 72 dpi to 360 dpi or greater resolution prior to printing.

Halftoning module class 48 includes modules for converting 32-bit CMYK input data to 4-bit CMYK data. In this regard, 32-bit CMYK data expanded by an expansion module must be converted to 4-bit CMYK data for printing using most color printers.

FIG. 3 also shows 3rd party module class 49, which may include modules to perform any color or image management function.

In more detail, auto correction module class 42 includes a histogram equalization module to perform histogram equalization on input 24-bit RGB data, a color correction module to perform automatic color, or hue, correction on the input data, and a level correction module to perform automatic level, or brightness, correction on the input data.

RGB to CMYK class 43 includes a Level 1 module implementing a simple transformation governed by the following equation:

$$\begin{bmatrix} C \\ Y \\ M \\ K \end{bmatrix} = \begin{bmatrix} 255 - R \\ 255 - G \\ 255 - B \\ 255 - \max(R, G, B) \end{bmatrix}$$

Class 43 also includes Level 2, Level 3, and Level 4 modules, which perform progressively more complex RGB to CMYK transformations according to the following equations, respectively:

Level 2

$$\begin{bmatrix} R_I \\ G_I \\ B_I \end{bmatrix} \Rightarrow \begin{bmatrix} a_{00} & a_{01} & a_{02} \\ a_{10} & a_{11} & a_{12} \\ a_{20} & a_{21} & a_{22} \end{bmatrix} \Rightarrow \begin{bmatrix} R_O \\ G_O \\ B_O \end{bmatrix} \Rightarrow \begin{bmatrix} C_O \\ M_O \\ Y_O \\ K_O \end{bmatrix}$$

Level 3

$$\begin{bmatrix} R_I \\ G_I \\ B_I \end{bmatrix} \Rightarrow \begin{bmatrix} a_{11} & a_{12} & \ldots & a_{1N} \\ a_{21} & a_{22} & \ldots & a_{2N} \\ & & \vdots & \\ a_{N1} & a_{N2} & \ldots & a_{NN} \end{bmatrix} \Rightarrow \begin{bmatrix} R_O \\ G_O \\ B_O \end{bmatrix} \Rightarrow \begin{bmatrix} C_O \\ M_O \\ Y_O \\ K_O \end{bmatrix}$$

and
Level 4

$$\begin{bmatrix} R_I \\ G_I \\ B_I \end{bmatrix} \Rightarrow \begin{bmatrix} LUT_R[R] \\ LUT_G[G] \\ LUT_B[B] \end{bmatrix} \Rightarrow \begin{bmatrix} a_{00} & a_{01} & a_{02} \\ a_{10} & a_{11} & a_{12} \\ a_{20} & a_{21} & a_{22} \end{bmatrix} \Rightarrow$$

$$3D \text{ to } 4D \text{ } LUT \Rightarrow \begin{bmatrix} LUT_C[C] \\ LUT_M[M] \\ LUT_Y[Y] \\ LUT_K[K] \end{bmatrix} \Rightarrow \begin{bmatrix} C_O \\ M_O \\ Y_O \\ K_O \end{bmatrix}$$

Similarly, RGB to RGB module class 44 includes Level 1, Level 2 and Level 3 modules for performing RGB to RGB transformations according to the following:

Level 1

$$\begin{bmatrix} R_O \\ G_O \\ B_O \end{bmatrix} = \begin{bmatrix} a_{00} & a_{01} & a_{02} \\ a_{10} & a_{11} & a_{12} \\ a_{20} & a_{21} & a_{22} \end{bmatrix} * \begin{bmatrix} 255\left(\frac{R_I}{255}\right)^\gamma \\ 255\left(\frac{G_I}{255}\right)^\gamma \\ 255\left(\frac{B_I}{255}\right)^\gamma \end{bmatrix}$$

or $$\begin{bmatrix} R_O \\ G_O \\ B_O \end{bmatrix} = \begin{bmatrix} a_{00} & a_{01} & a_{02} \\ a_{10} & a_{11} & a_{12} \\ a_{20} & a_{21} & a_{22} \end{bmatrix} * \begin{bmatrix} LUT_R[R_I] \\ LUT_G[G_I] \\ LUT_B[B_I] \end{bmatrix}$$

Level 2

$$R_i G_i B_i \longrightarrow \begin{array}{c} RGB \text{ to} \\ N\text{-vector} \end{array} \longrightarrow \begin{array}{c} 3 \times N \text{ Matrix} \\ \text{Multiply} \end{array} \longrightarrow R_o G_o B_o$$

and
Level 3

$$\begin{bmatrix} R_I \\ G_I \\ B_I \end{bmatrix} \Rightarrow \begin{bmatrix} LUT_R[R] \\ LUT_G[G] \\ LUT_B[B] \end{bmatrix} \Rightarrow \begin{bmatrix} a_{00} & a_{01} & a_{02} \\ a_{10} & a_{11} & a_{12} \\ a_{20} & a_{21} & a_{22} \end{bmatrix} \Rightarrow$$

$$3D \text{ } LUT \Rightarrow \begin{bmatrix} LUT_R[R] \\ LUT_G[G] \\ LUT_B[B] \end{bmatrix} \Rightarrow \begin{bmatrix} R_O \\ G_O \\ B_O \end{bmatrix}$$

Furthermore, CMYK to CMYK module class 45 includes a Level 1 and a Level 2 module to convert data of a 32-bit CMYK color space to another 32-bit CMYK colorspace according to the following equations:

Level 1

$$\begin{bmatrix} C_O \\ M_O \\ Y_O \\ K_O \end{bmatrix} = \begin{bmatrix} LUT_C[C_I] \\ LUT_M[M_I] \\ LUT_Y[Y_I] \\ LUT_K[K_I] \end{bmatrix}$$

and
Level 2

$$\begin{bmatrix} C_I \\ M_I \\ Y_I \\ K_I \end{bmatrix} \Rightarrow \begin{bmatrix} LUT_C[C] \\ LUT_M[M] \\ LUT_Y[Y] \\ LUT_K[K] \end{bmatrix} \Rightarrow 4D \text{ } LUT \Rightarrow \begin{bmatrix} LUT_C[C] \\ LUT_M[M] \\ LUT_Y[Y] \\ LUT_K[K] \end{bmatrix} \Rightarrow \begin{bmatrix} C_O \\ M_O \\ Y_O \\ K_O \end{bmatrix}$$

BG/UCR module class 46 includes a Level 1 module to perform simple black generation/undercolor removal according to:

$$\begin{bmatrix} C_O \\ M_O \\ Y_O \\ K_O \end{bmatrix} = \begin{bmatrix} C_I - K_I + ucr_c[K_I] \\ M_I - K_I + ucr_m[K_I] \\ Y_I - K_I + ucr_y[K_I] \\ bg[K_I] \end{bmatrix}$$

and a Special-1 module to perform BG/UCR processing as follows:

$$C_i M_i Y_i K_i \rightarrow BG/UCR \rightarrow C_o M_o Y_o K_o$$

Replication, Linear, and Cubic modules of Expansion module class 47 use pixel replication, linear interpolation, and cubic interpolation, respectively, to expand pixel data. In addition, Halftoning module class 48 includes a Floyd-Steinberg module, an ICICLE module, and a Dithering module to perform halftoning using either Floyd-Steinberg, ICICLE, or Dithering halftoning methods. A suitable ICICLE halftoning method is described in a commonly-assigned U.S. patent application Ser. No. 09/184,551 entitled "Halftoning By Enhanced Error Diffusion" (Internal Ref. No. MOI-323) and naming Victor Ostromoukhov as inventor.

It should be noted that the foregoing modules and module classes are merely representative of a preferred embodiment of the present invention. Accordingly, any module classes defining a color or image management function, and any modules for performing a color or image management function, can be used in conjunction with the present invention.

In this regard, associated with each module of an architecture according to the present invention is a module description file which includes information indicating input/output formats, processor requirements, memory requirements, processing quality, and performance of the associated module. As described below, this information is used in order to select modules for use in a color and image management system created according to the present invention.

As shown, each module of module classes 42 to 49 interfaces with core module 50. As such, core module 50 can access each module shown in FIG. 3. Also interfacing to core module 50 is configurator application 55.

In operation, configurator application 55 receives information regarding operating parameters of a system for which a target color and image management system is to be developed. More specifically, the operating parameters describe a system in which a target system is intended to operate, and do not describe computing equipment 1, which is used to develop the target color management system. Based on the operating parameters, configurator 55 builds a list of modules for use in the target system. The list is input to core module 50, which links the listed modules, along with various memory management and I/O functionality, to produce a color and image management system specific to the received operating parameters.

Preferably, configurator application 55 includes computer-executable process steps to display a user interface on display screen 2 and to receive the operating parameters through the displayed user interface. Such operating parameters may include input device type, output device type, operating system, interface between the input device and the output device, available memory, available processor power, available hard disk space or the like. With respect to the available memory, processor power, and hard disk space parameters, these parameters may instead specify total system memory, processor power, and hard disk space, and configurator 55 may include process steps to estimate available values therefrom.

FIG. 4 illustrates various systems for which a target color and image management system according to the present invention may be developed. As shown in FIG. 4A, one contemplated system includes digital camera 60, a 24-bit RGB device, and hand-held PC 65, also a 24-bit RGB device. For the present example, hand-held PC 65 executes the Windows CE 2.0 operating system on a MIPS RISC processor and includes 16 Mb RAM. For such a system, a color and image management system preferably performs color correction, image correction such as linearization, tone reproduction, or gray balance adjustment, and "red eye" correction. However, it is essential in such a system to use a color and image management system having a small memory footprint and using minimal processing power. Moreover, a color management system running on hand-held PC 65 must comply with Windows CE 2.0 operating system requirements. Accordingly, using the present invention, the above-described operating system parameters are input to configurator application 55 to provide a list of necessary modules for combination into a color and image management system for use with the FIG. 4A system.

FIG. 4B shows a system including scanner 70 and hand-held PC 65. The FIG. 4B system includes similar operating constraints as described with respect to the FIG. 4A system. However, a color and image management system for use in the FIG. 4B system preferably includes auto color correction, RGB to RGB gray balance adjustment, and scratch removal features. Accordingly, the present invention can be used to produce a color and image management system to perform these tasks within the operating parameters.

Figure 4C:
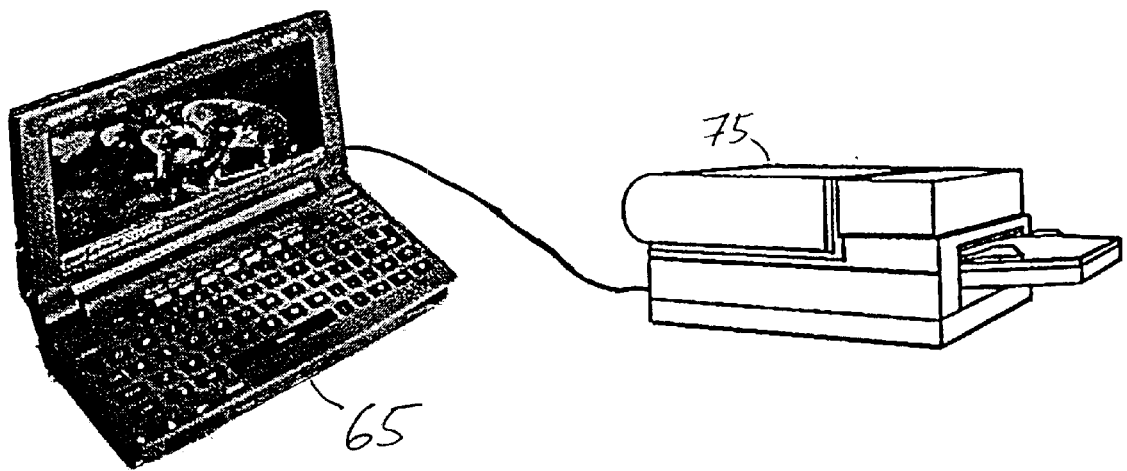

FIG. 4C shows hand-held PC 65 and printer 75 as input and output devices, respectively, of a system requiring a color and image management system. The operating parameters described above with respect to hand-held PC 65 apply as well to the FIG. 4C system. Additionally, however, due to the nature of hand-held PC 65 and printer 75, 24-bit RGB data at 72 dpi resolution must be transformed by the color and image management system into 4-bit CMYK data at 360 dpi resolution.

Figure 4D:
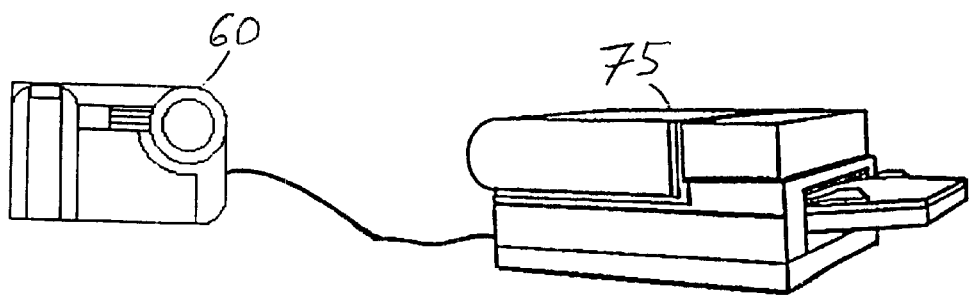

As a final example, FIG. 4D shows a system including digital camera 60 and printer 75. As described above with respect to the FIG. 4C system, the FIG. 4D system requires a color and image management system to convert 24-bit RGB data to 4-bit, higher resolution, CMYK data. In addition, such a color and image management system must be embedded in either digital camera 60 or printer 75 and therefore must have a small memory footprint and require minimal processing power.

Advantageously, a modularized architecture for a color management system according to the present invention is capable of providing color and image management systems suitable for use in each of the systems illustrated in FIG. 4A to FIG. 4D. Notably, each management system provides different functionality and complies with different specified operating parameters.

Figure 5:
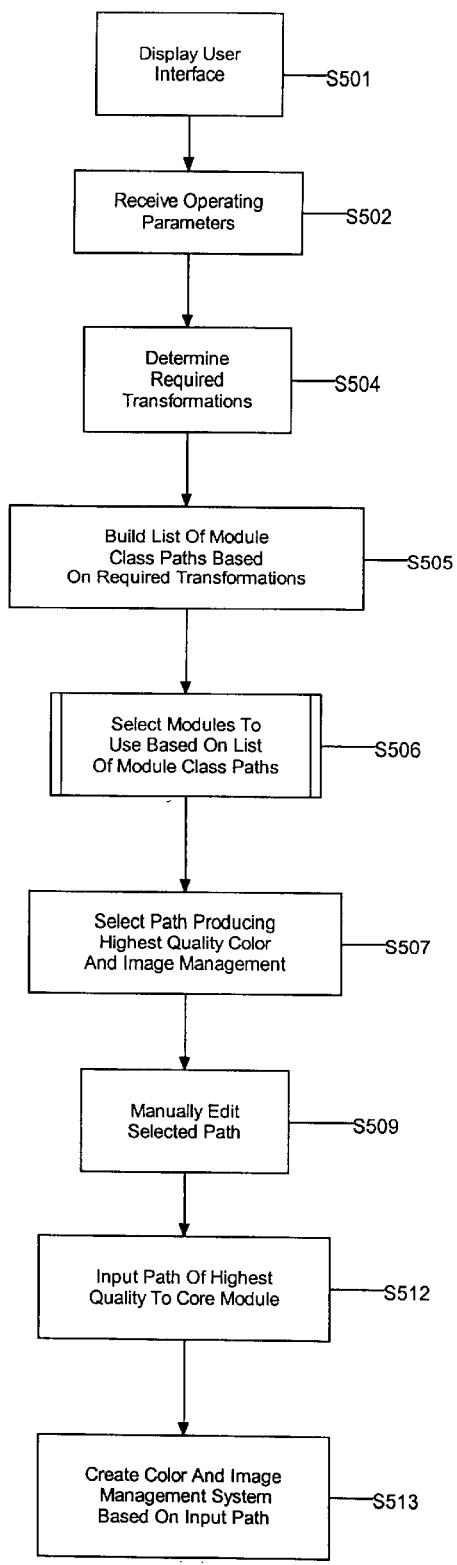
FIG. 5 is a flow diagram of process steps to create a color and image management system according to the present invention.

FIG. 5 is a flow diagram of process steps to create a color and image management system in accordance with the present invention. The FIG. 5 process steps are preferably embodied in computer-executable process steps stored on fixed disk 3 and executed out of RAM 30 by CPU 20.

Generally, the FIG. 5 process steps are for a configurator which accesses information of classes of color and image management modules, each class performing specific color management functionality, and each class including plural different modules each varying in complexity and processing quality from other modules in the class. The steps include steps to input user-defined parameters defining an operating environment in which a target color and image management system is designed to operate, to select modules from selected classes based on the input parameters, and to provide a list of modules for building the target color and image management system.

More specifically, the FIG. 5 flow begins at step S501, in which a user interface is displayed to a user on display screen 2. As mentioned above, a configurator application according to the present invention preferably includes computer-executable process steps to display such a user interface. Next, in step S502, operating parameters input into the user interface are received by configurator 55. Color transformations required by the received parameters are then determined in step S504. Using the system shown in FIG. 4D as an example, it is determined in step S504 that it is necessary to transform 24-bit RGB data from camera 60 to 4-bit CMYK data for input to printer 75.

Next, in step S505, a list of module class paths is built according to the required transformation. Each module class path represents a process available via the functions of module classes 42 to 49 which can be used to realize the transformation determined in step S504. FIG. 6 shows a list of three such paths. In FIG. 6, brackets indicate functions of a module class shown in FIG. 3. As described with respect to step S505, each of paths 1, 2 and 3 represents a sequence of functions which, in combination, convert 24-bit RGB data to 4-bit CMYK data of greater resolution.

In step S506, the list of module class paths is analyzed in conjunction with the received operating parameters to determine modules of each path for use in the target color and image management system. Step S506 will be described in greater detail below with respect to FIG. 7. It should be noted that, after step S506, each path consists of a sequence of selected modules.

Next, in step S507, quality factors of each selected module in each path are summed to select a path producing highest quality image processing. As described above, if quality factors located within module description files for each module are on a 1 to 5, high-to-low scale, than the path having the highest quality is the path having the lowest sum calculated in step S507. Alternatively, if the quality factors are arranged from a 1 to 5, low-to-high scale, the path having the highest quality is that having the greatest sum calculated in step S507.

In another embodiment, the module description file corresponding to each module includes a performance factor, which may be on a 1 to 5, high performance to low performance scale. Accordingly, assuming that lower performance translates to higher quality image processing, the path having the greatest sum calculated in step S507 is selected. Conversely, using a 1 to 5, low-to-high performance factor scale, the path having the lowest sum is selected.

Flow proceeds from step S507 to step S509, wherein a user may edit the selected path. Such manual editing may include substituting one selected module for another module of the same class, or addition and subtraction of modules in the selected path.

Next, in step S512, the resulting path of modules is input to core module 50, preferably in the form of high-level language source code. In step S513, core module 50 creates a color and image management system using the modules of the input path according to the order specified in the input path. In doing so, core module 50 also adds memory management, input/output, and other functionality to the modules to create a color and image management system. By virtue of the FIG. 5 process steps, a color and image management system is created which realizes required transformations and which falls within specified operating parameters.

Figure 7:
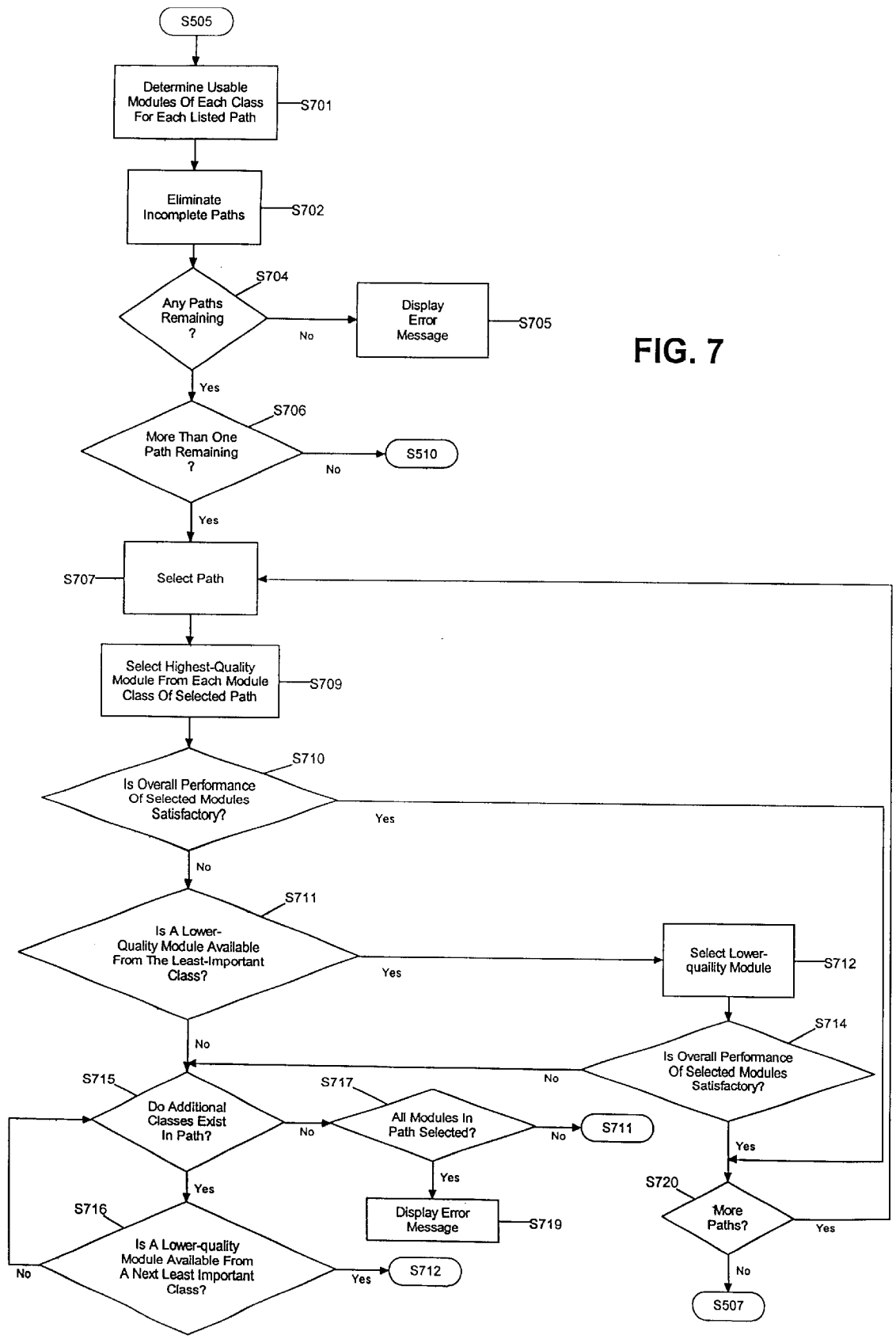
FIG. 7 is a flow diagram of process steps to determine modules for use in a color and image management system according to the present invention.

FIG. 7 is a detailed flow diagram of process steps to perform above-described step S506. The FIG. 7 process steps are preferably stored in disk 3 and executed out of RAM 30 by CPU 20.

The FIG. 7 flow begins at step S701, in which modules are selected for each class of each path in the list built in step S505. In particular, for each module class listed in a path, module description files of class modules are examined to determine which modules comply with the operating parameters. Therefore, only modules having module description files indicating memory or processor requirements within those indicated by the received operating parameters are determined to be usable. Accordingly, after step S701, some module classes of the listed paths will contain all available modules of that class, other module classes will contain less than all modules available within that class, and still other module classes may not contain any modules, since no modules included in those classes satisfy the memory, processor, or other requirements.

Accordingly, in step S702, those listed paths having one or more empty module classes are eliminated from the list of paths. These paths are eliminated because the functionality represented by these paths cannot be implemented in accordance with the operating constraints. Next, in step S704, it is determined whether any paths remain in the list. If not, an error message is displayed on display screen 2 in step S705, which indicates that a color and image management system cannot be created in accordance with the specified operating parameters and the available module classes and modules. If step S704 results in an affirmative determination, flow proceeds to step S706, wherein it is determined whether more than one path is remaining in the path list. If only one path remains, flow proceeds to step S510 and continues as described above. If more than one path remains, flow proceeds to step S707.

In step S707, one of the remaining paths in the list of module class paths is selected. Next, in step S709, a highest quality module is selected from each module class of the selected path. As described above, relative processing quality between modules in a class can be determined from quality factors stored in module description files for each module in the class.

Next, in step S710, it is determined whether the overall performance of the modules selected in step S709 is satisfactory based on the received operating parameters. The determination in step S710 can be based on any type of performance factor stored in a module description file for each selected module. In a preferred embodiment, each module description file stores a number of processor cycles needed per pixel processed by its associated module. Accordingly, the cycles per pixel value of each selected module is summed in step S710 to determine whether the overall performance of the selected modules satisfies a cycles per pixel requirement gleaned from the received operating parameters. If the overall performance is satisfactory, flow continues to step S720. In step S720, it is determined whether any paths in the list of module class paths have not yet been examined. If so, flow returns to step S707. If no paths remain to be examined, flow continues from step S720 to step S507 as described above.

If, in step S710, it is determined that the overall performance of the modules selected in step S709 is not satisfactory, flow continues to step S711. With regard to step S711, it should be noted, that for each module class of a modularized architecture according to the present invention, an importance factor is stored. This importance factor may be stored within configurator 55, or within the module description file of each module belonging to a module class. The importance factor is used in step S711 to determine whether a lower-quality module is available in the least-important class in the selected path. It should be noted that the available modules in a class are determined from those modules in the class deemed usable in step S701. Furthermore, as described above, whether a module is of lower quality than another module is determined according to quality factors stored in module description files corresponding to each module.

If no lower quality module is available from the least important class, flow continues to step S715. However, if a lower-quality module is available, flow proceeds to step S712, wherein the lower quality module is selected to replace the module of the same module class selected in step S709. Then, in step S714, the new group of selected modules is analyzed as described above with respect to step S710 to determine whether the overall performance thereof is satisfactory. If so, flow proceeds to step S720. If not, flow continues to step S715.

If it is determined in step S715 that additional classes exist in the selected path, it is then determined, in step S716, whether a lower-quality module is available from a next least-important class. If such a module is available, flow proceeds to step S712, wherein the lower-quality module from the next least-important class is selected to replace the module from the same module class selected in step S709.

Upon returning a negative answer in step S716, flow returns to step S715. If, in step S715, it is thereafter determined that no additional classes exist in the selected path, it is determined in step S717 whether all modules in the selected path have been selected and used in a determination of overall performance in either step S710 or S714. If not, flow returns to step S711. If so, flow continues to step S719, wherein an error message is displayed on display screen 2 which indicates that no color and image management system can be produced based on the provided modules, module classes and operating parameters.

By virtue of the foregoing process steps, a path of modules is determined which can be used to provide a color and image management system usable in a specific operating environment and producing satisfactory image quality.

It should be understood that other methods for selecting particular modules from selected module classes may also be used in practicing the present invention. For example, the iterations of process steps S707 to S720 can be altered so that each module of a least-important module class is substituted one-by-one into a group of selected modules to attempt to determine a group having a satisfactory overall performance. After each available module in the least-important module class is substituted without finding a satisfactory group, modules from a next least-important module class are substituted into the group, and the process repeats until a satisfactory group is determined.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A configurator for use in generating a target color and image management system, the configurator having access to classes of color and image management modules, each class performing specific color and image management functionality, and each class including plural different modules each varying in complexity and processing quality from other modules in the class, the configurator comprising:

means for inputting user-defined parameters that define an operating environment in which the target color and image management system is designed to operate;

means for automatically selecting modules from selected classes, wherein the selected modules represent an optimal combination of modules selected from multiple alternative module combinations each for carrying out image and color transformations determined based on the input parameters; and means for providing a list of the selected modules for use in building the target color and image management system.

2. A configurator according to claim 1, wherein the user-defined parameters include memory and processor capabilities, input and output device definition, operating system requirements, and operating system identity.

3. A configurator according to claim 1, wherein said means for automatically selecting comprises:

means for determining needed color transformations, based on input device and output device parameters;

means for building a path list based on the needed transformations, each path in the path list representing a combination of modules selected from the classes of color and image management modules that can realize the needed transformations; and analyzing means for analyzing quality factors for each path in the path list, so as to determine which of the operative paths in the path list has the highest quality within the user-defined parameters.

4. A configurator for use in generating a target color and image management system, the configurator having access to classes of color and image management modules, each class performing specific color and image management functionality, and each class including plural different modules each varying in complexity and processing quality from other modules in the class, the configurator comprising:

means for inputting user-defined parameters that define an operating environment in which the target color and image management system is designed to operate;

means for determining needed color transformations, based on input device and output device parameters;

means for building a path list based on the needed transformations, the path list consisting of multiple paths of all possible classes of modules that could realize the needed transformations; and analyzing means for analyzing quality factors for each path in the path list, so as to determine which of the operative paths in the path list has the highest quality within the user-defined parameters;

means for providing a list of the selected modules for use in building the target color and image management system, wherein the configurator includes a preassigned weight corresponding to an impact on image quality of each different class of modules, wherein each different module in each class corresponds to a quality factor, and wherein said analyzing means determines the highest quality operative path by summing the quality factors of each module of each path in the list.

5. A configurator for use in generating a target color and image management system, the configurator having access to classes of color and image management modules, each class performing specific color and image management functionality, and each class including plural different modules each varying in complexity and processing quality from other modules in the class, the configurator comprising:

means for inputting user-defined parameters that define an operating environment in which the target color and image management system is designed to operate;

means for determining needed color transformations, based on input device and output device parameters;

means for building a path list based on the needed transformations, the path list consisting of multiple paths of all possible classes of modules that could realize the needed transformations; and analyzing means for analyzing quality factors for each path in the path list, so as to determine which of the operative paths in the path list has the highest quality within the user-defined parameters;

means for providing a list of the selected modules for use in building the target color and image management system, wherein in the event that the configurator is not able to choose the highest quality module in each class of modules and still meet memory and processor constraints, said configurator iterates through the path list and chooses a next lower quality module in the least important class, until overall performance constraints can be met.

6. A configurator according to claim 1, wherein said configurator includes a manual edit mode, whereby the developer can alter automatic selections made by the configurator so as to suit specific needs of the target system.

7. A configurator according to claim 1, wherein the configurator automatically generates source code in a higher level language to implement the selected modules.

8. A configurator according to claim 7, wherein the source code is input to a core module which forms a framework into which each of the selected modules may be inserted so as to obtain the target color and image management system.

9. A method for generating a target color and image management system using classes of color and image management modules, each class performing specific color and image management functionality, and each class including plural different modules each varying in complexity and processing quality from other modules in the class, the method comprising:

inputting user-defined parameters that define an operating environment in which the target color and image management system is designed to operate;

automatically selecting modules from selected classes, wherein the selected modules represent an optimal combination of modules selected from multiple alternative module combinations each for carrying out image and color transformations determined based on the input parameters; and providing a list of the selected modules for use in building the target color and image management system.

10. A method according to claim 9, wherein the user-defined parameters include memory and processor capabilities, input and output device definition, operating system requirements, and operating system identity.

11. A method according to claim 9, wherein said selecting step comprises:

determining needed color transformations, based on input device and output device parameters;

building a path list based on the needed transformations, each path in the path list representing a combination of modules selected from the classes of color and image management modules that can realize the needed transformations; and analyzing quality factors for each path in the path list, so as to determine which of the operative paths in the path list has the highest quality within the user-defined parameters.

12. A method for generating a target color and image management system using classes of color and image management modules, each class performing specific color and image management functionality, and each class including plural different modules each varying in complexity and processing quality from other modules in the class, the method comprising:

inputting user-defined parameters that define an operating environment in which the target color and image management system is designed to operate;

determining needed color transformations, based on input device and output device parameters;

building a path list based on the needed transformations, the path list consisting of multiple paths of all possible classes of modules that could realize the needed transformations; and analyzing quality factors for each path in the path list, so as to determine which of the operative paths in the path list has the highest quality within the user-defined parameters;

providing a list of the selected modules for use in building the target color and image management system, wherein, for each different class of modules, a preassigned weight corresponds to an impact on image quality, wherein each different module in each class corresponds to a quality factor, and wherein said analyzing step further comprises determining the highest quality operative path by summing the quality factors of each module of each path in the list.

13. A method for generating a target color and image management system using classes of color and image management modules, each class performing specific color and image management functionality, and each class including plural different modules each varying in complexity and processing quality from other modules in the class, the method comprising:

inputting user-defined parameters that define an operating environment in which the target color and image management system is designed to operate;

determining needed color transformations, based on input device and output device parameters;

building a path list based on the needed transformations, the path list consisting of multiple paths of all possible classes of modules that could realize the needed transformations; and analyzing quality factors for each path in the path list, so as to determine which of the operative paths in the path list has the highest quality within the user-defined parameters;

providing a list of the selected modules for use in building the target color and image management system, wherein in the event that the highest quality module in each class of modules cannot be chosen while meeting memory and processor constraints, the method further comprises iterating through the path list and chooses a next lower quality module in the least important class, until overall performance constraints can be met.

14. A method according to claim 9, further comprising manual editing automatic selections made according to the method so as to suit specific needs of the target system.

15. A method according to claim 9, further comprising automatically generating source code in a higher level language to implement the selected modules.

16. A method according to claim 15, wherein the source code is input to a core module which forms a framework into which each of the selected modules may be inserted so as to obtain the target color and image management system.

17. A computer-readable medium storing computer-executable process steps to generate a target color and image management system using classes of color and image management modules, each class performing specific color and image management functionality, and each class including plural different modules each varying in complexity and processing quality from other modules in the class, the steps comprising:
- a receiving step to receive user-defined parameters that define an operating environment in which the target color and image management system is designed to operate;
- a selecting step to automatically select modules from selected classes, wherein the selected modules represent an optimal combination of modules selected from multiple alternative module combinations each for carrying out image and color transformations determined based on the received parameters; and
- a providing step to provide a list of the selected modules for use in building the target color and image management system.

18. A medium according to claim 17, wherein the user-defined parameters include memory and processor capabilities, input and output device definition, operating system requirements, and operating system identity.

19. A medium according to claim 17, wherein said selecting step comprises:
- a determining step to determine needed color transformations, based on input device and output device parameters;
- a building step to build a path list based on the needed transformations, each path in the path list representing a combination of modules selected from the classes of color and image management modules that can realize the needed transformations; and
- an analyzing step to analyze quality factors for each path in the path list, so as to determine which of the operative paths in the path list has the highest quality within the user-defined parameters.

20. A computer-readable medium storing computer-executable process steps to generate a target color and image management system using classes of color and image management modules, each class performing specific color and image management functionality, and each class including plural different modules each varying in complexity and processing quality from other modules in the class, the steps comprising:
- a receiving step to receive user-defined parameters that define an operating environment in which the target color and image management system is designed to operate;
- a determining step to determine needed color transformations, based on input device and output device parameters;
- a building step to build a path list based on the needed transformations, the path list consisting of multiple paths of all possible classes of modules that could realize the needed transformations; and
- an analyzing step to analyze quality factors for each path in the path list, so as to determine which of the operative paths in the path list has the highest quality within the user-defined parameters;
- a providing step to provide a list of the selected modules for use in building the target color and image management system,
- wherein, for each different class of modules, a preassigned weight corresponds to an impact on image quality, wherein each different module in each class corresponds to a quality factor, and wherein said analyzing step further comprises a determining step to determine the highest quality operative path by summing the quality factors of each module of each path in the list.

21. A computer-readable medium storing computer-executable process steps to generate a target color and image management system using classes of color and image management modules, each class performing specific color and image management functionality, and each class including plural different modules each varying in complexity and processing quality from other modules in the class, the steps comprising:
- a receiving step to receive user-defined parameters that define an operating environment in which the target color and image management system is designed to operate;
- a determining step to determine needed color transformations, based on input device and output device parameters;
- a building step to build a path list based on the needed transformations, the path list consisting of multiple paths of all possible classes of modules that could realize the needed transformations; and
- an analyzing step to analyze quality factors for each path in the path list, so as to determine which of the operative paths in the path list has the highest quality within the user-defined parameters;
- a providing step to provide a list of the selected modules for use in building the target color and image management system,
- wherein in the event that the highest quality module in each class of modules cannot be chosen while meeting memory and processor constraints, the steps further comprise an iterating step to iterate through the path list and chooses a next lower quality module in the least important class, until overall performance constraints can be met.

22. A medium according to claim 17, the steps further comprising a receiving step to receive manual edits of automatic selections made according to the steps so as to suit specific needs of the target system.

23. A medium according to claim 17, the steps further comprising a generating step to automatically generate source code in a higher level language to implement the selected modules.

24. A medium according to claim 23, further comprising an input step to input the source code to a core module which forms a framework into which each of the selected modules may be inserted so as to obtain the target color and image management system.

* * * * *

UNITED STATES PATENT AND TRADEMARK OFFICE
CERTIFICATE OF CORRECTION

PATENT NO. : 6,518,975 B1  
DATED : February 11, 2003  
INVENTOR(S) : Manish Kulkarni et al.

It is certified that error appears in the above-identified patent and that said Letters Patent is hereby corrected as shown below:

<u>Title page,</u>  
Item [56], References Cited, U.S. PATENT DOCUMENTS, "3/2000 Lynch" should read -- 3/2000 Meir et al. --.

Signed and Sealed this

Twenty-third Day of March, 2004

JON W. DUDAS  
*Acting Director of the United States Patent and Trademark Office*